United States Patent [19]

Hargadon et al.

[11] Patent Number: 5,420,493
[45] Date of Patent: May 30, 1995

[54] POWER SUPPLY AND BATTERY CHARGER

[75] Inventors: Andrew Hargadon, Palo Alto; Steven J. Young, Miltpitas, both of Calif.; Kihachiro Tonomura, Yamato, Japan; Markus Wallgren, Mountain View; Mark Gurries, San Jose, both of Calif.

[73] Assignee: Apple Computer, Inc., Cupertino, Calif.

[21] Appl. No.: 907,762

[22] Filed: Jun. 30, 1992

[51] Int. Cl.⁶ .................. H01M 10/44; H02J 7/00
[52] U.S. Cl. .......................... 320/15; 320/22
[58] Field of Search .......... 320/2, 5, 15, 20, 21, 320/22, 23, 24, 31, 32, 39, 40

[56] References Cited

U.S. PATENT DOCUMENTS

| | | | |
|---|---|---|---|
| 328,276 | 7/1992 | Koinuma | D13/107 |
| 3,925,714 | 12/1975 | Sherman, Jr. | 320/39 |
| 4,232,260 | 11/1980 | Lambkin | 320/2 |
| 4,746,852 | 5/1988 | Martin | 320/39 X |
| 4,965,738 | 10/1990 | Bauer et al. | 320/39 X |
| 5,049,804 | 9/1991 | Hutchings | 320/39 X |
| 5,157,320 | 10/1992 | Kuriloff | 320/39 |
| 5,162,719 | 11/1992 | Tomura et al. | 320/2 |

*Primary Examiner*—Kristine L. Peckman
*Attorney, Agent, or Firm*—Richard C. Liu

[57] ABSTRACT

An integrated AC adapter and battery charger is disclosed. The apparatus comprises an AC adapter unit for converting AC power to a DC power and a battery charging apparatus coupled to the AC adapter unit for charging a battery pack. The battery charging apparatus further comprises a microcontroller for sensing the condition of the battery pack or tacks being charged, a memory for storing the proper charging profile for a number of different types of battery packs, and a charging current generator capable of generating a varying charging current based on the microcontroller's determination of the battery's condition and the charging profile stored in the memory.

11 Claims, 10 Drawing Sheets

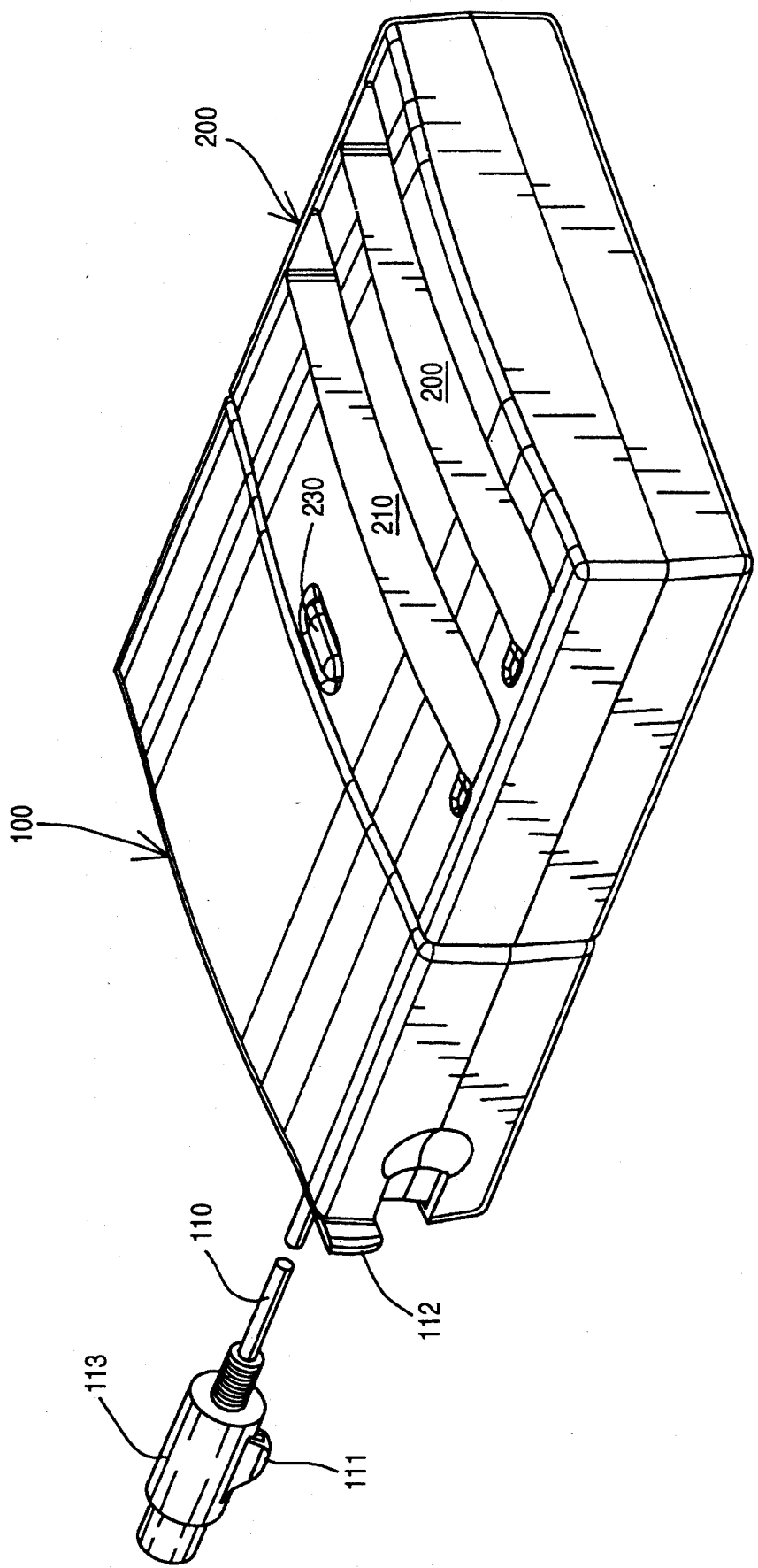
FIG_1

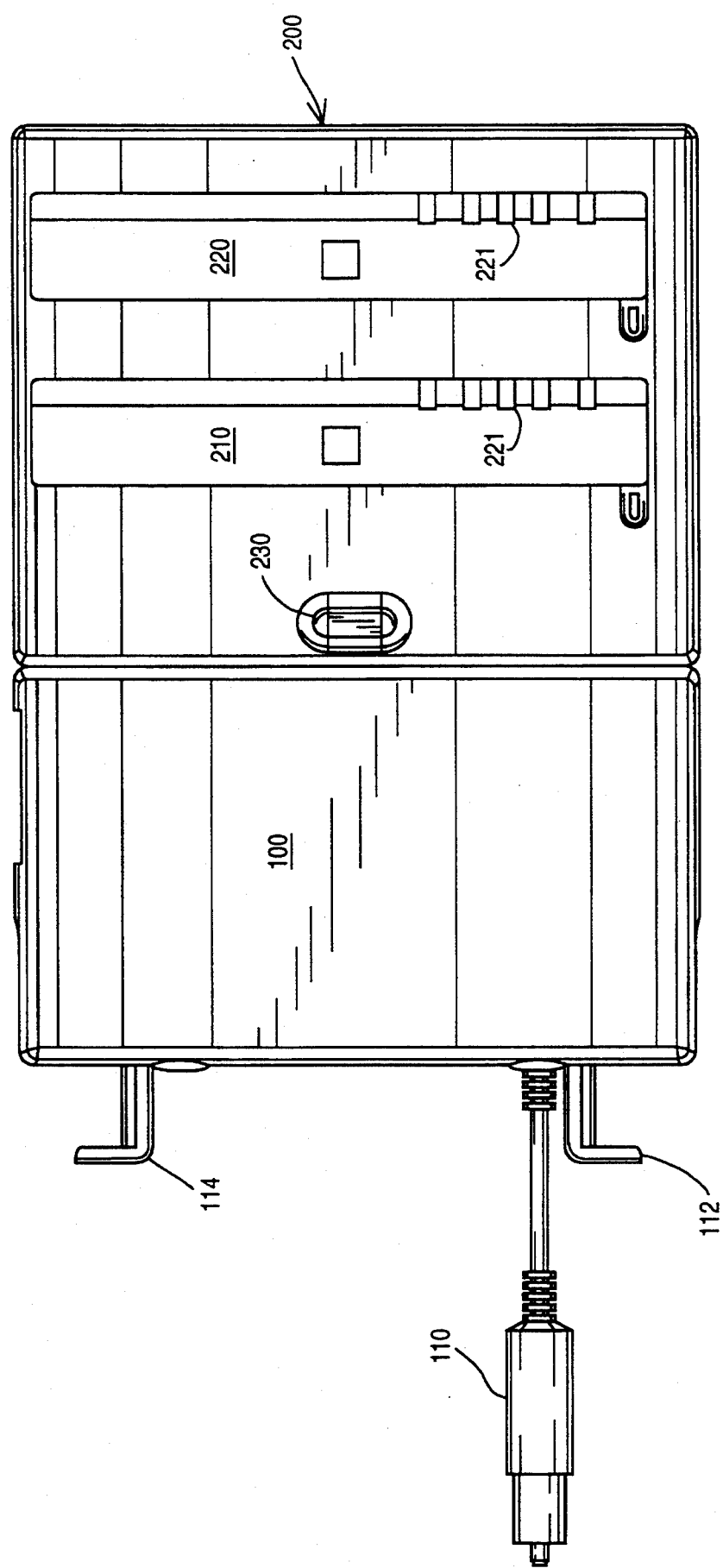
FIG_2

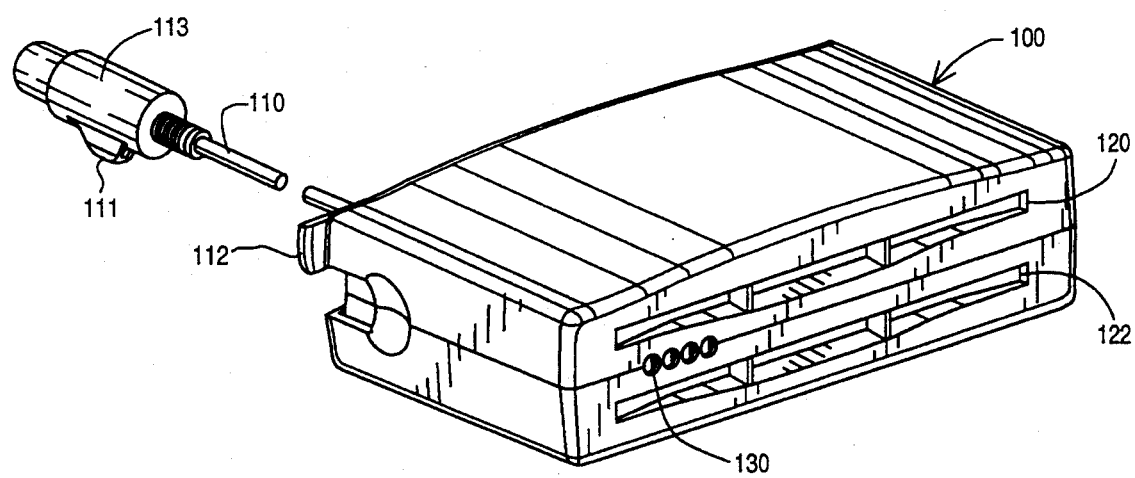
FIG_3
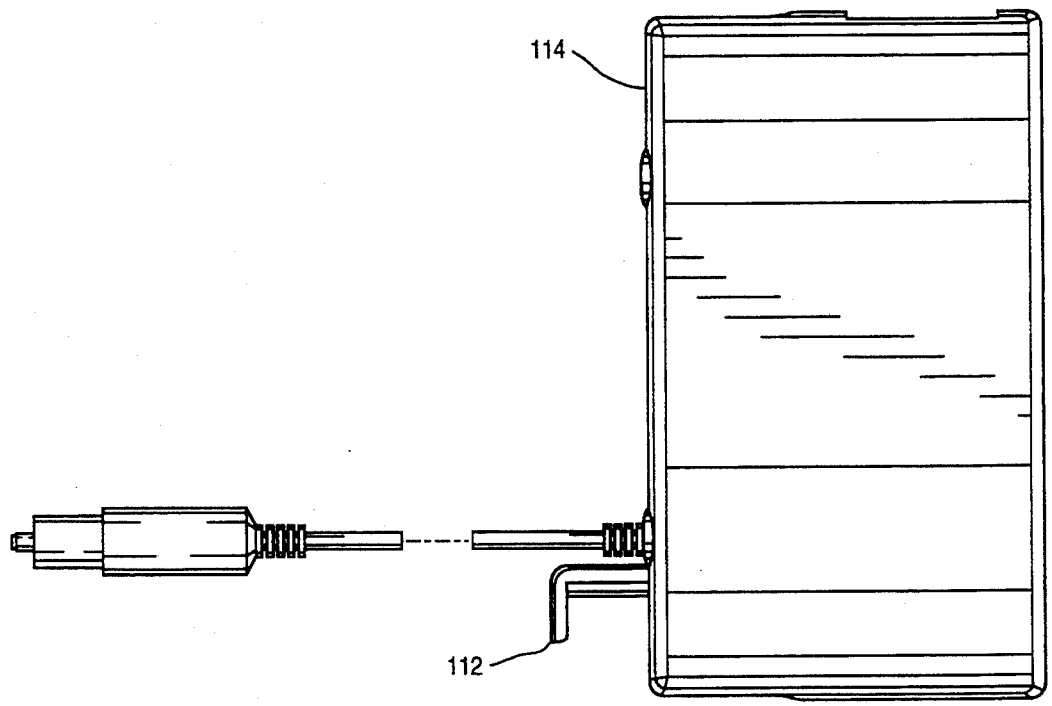
FIG_4

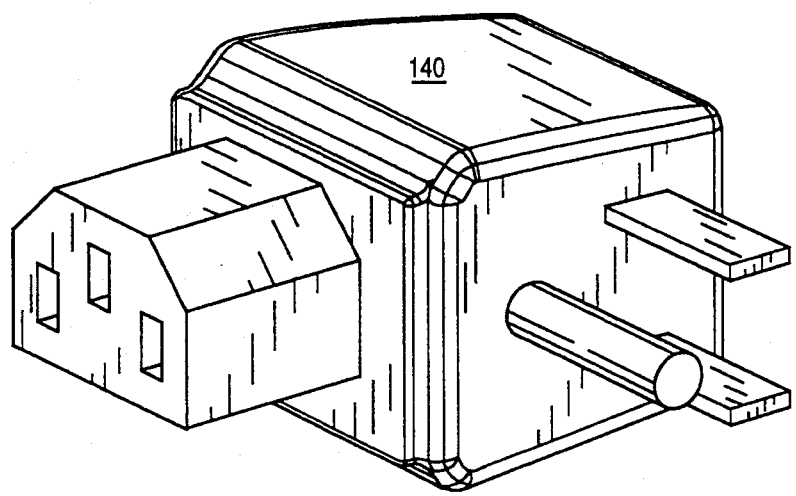
FIG_5A
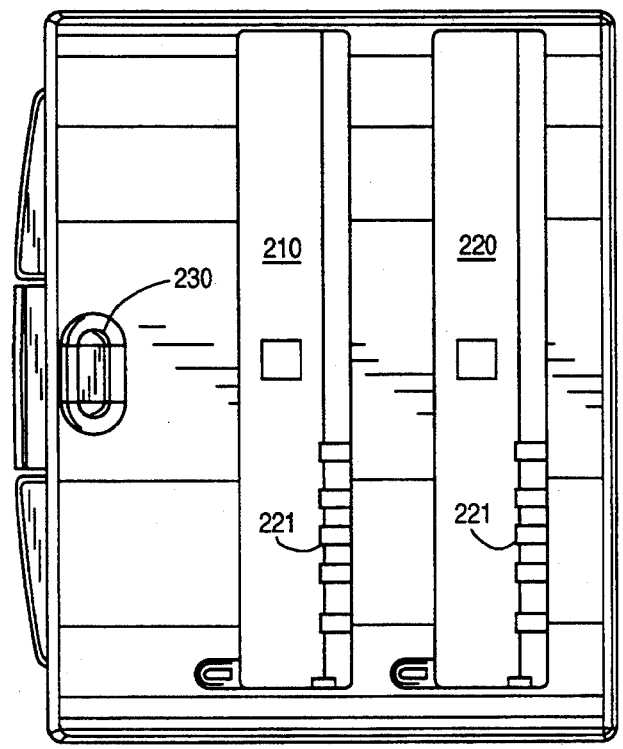
FIG_6
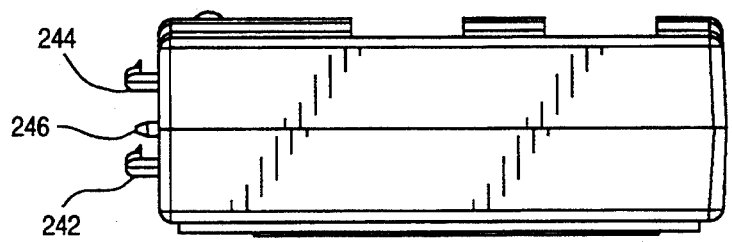
FIG_7

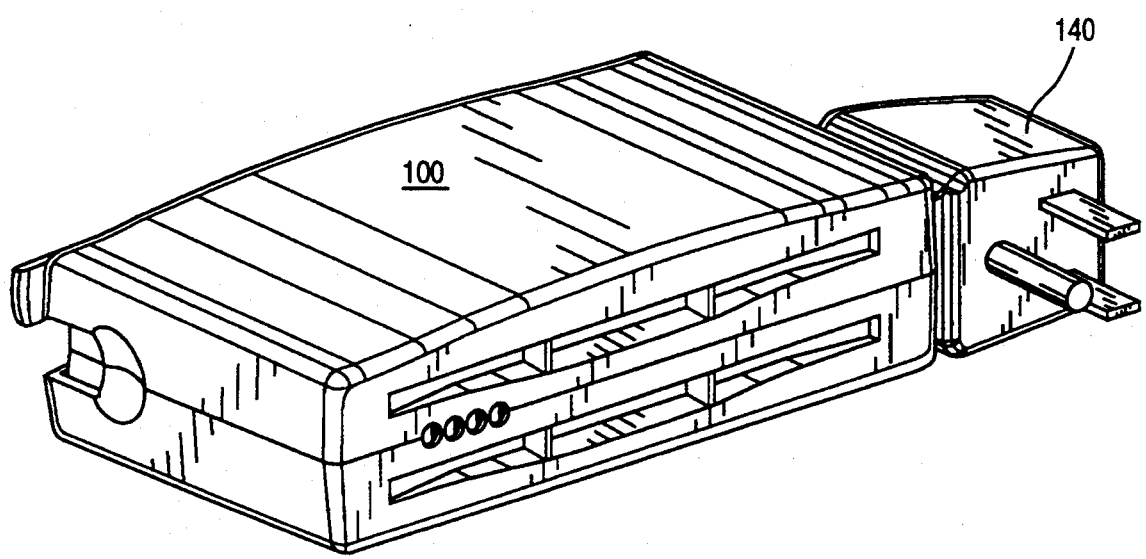
FIG_5B

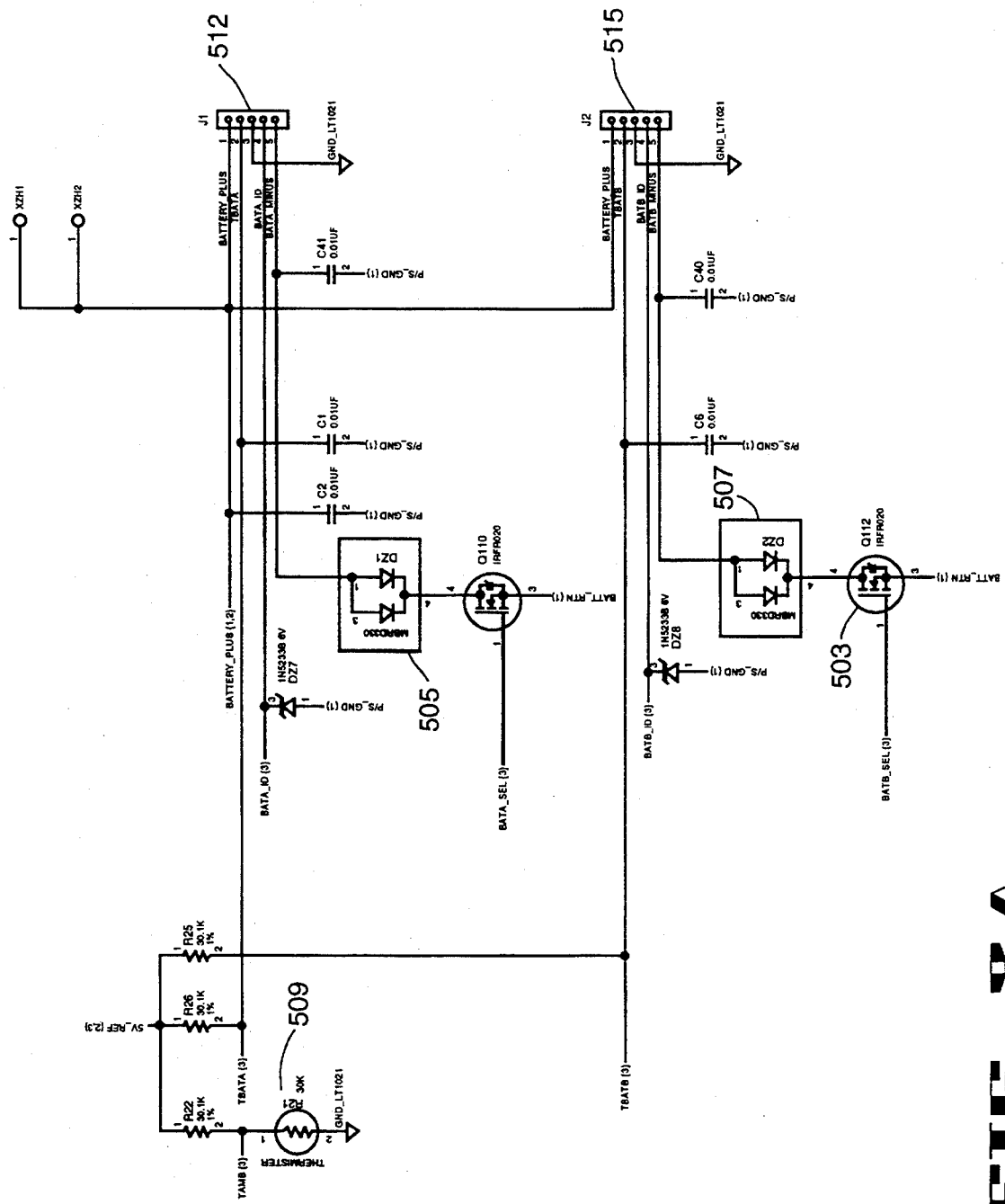

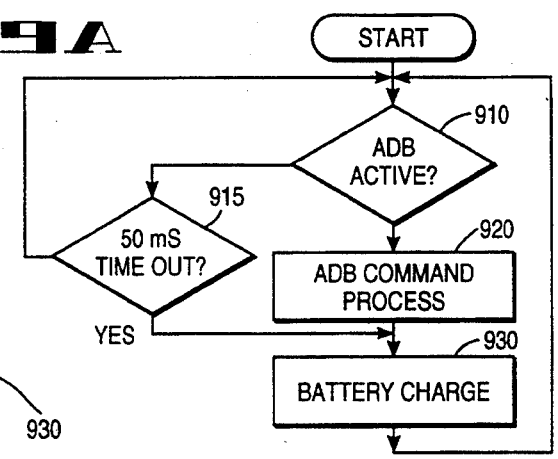
FIG_9A
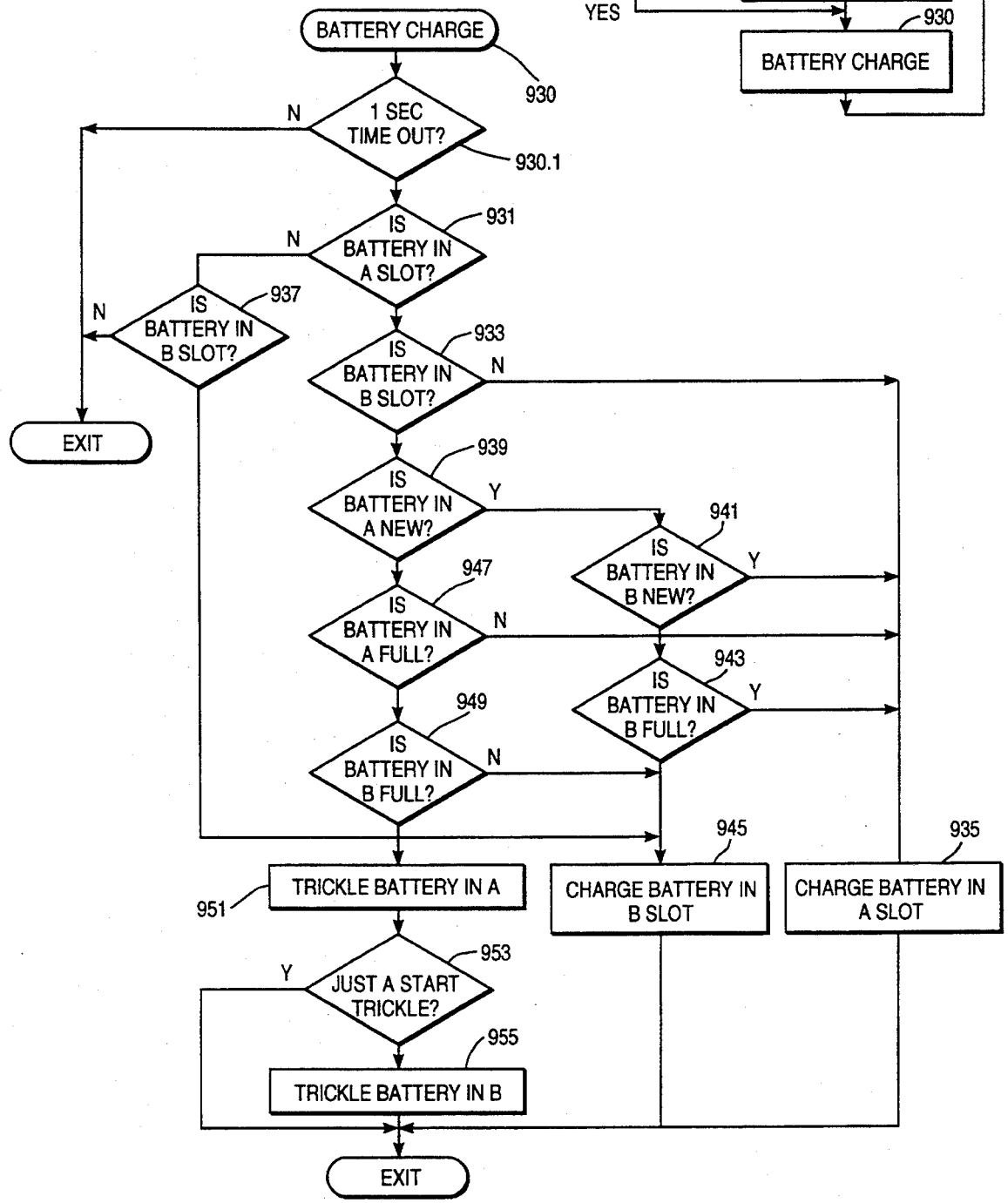
FIG_9B

POWER SUPPLY AND BATTERY CHARGER

BACKGROUND OF THE INVENTION

This invention is in the field of battery chargers and power supplies. In particular, a preferred embodiment of the present invention comprises a programmable power supply and battery charger for a portable computer.

Using an alternating current ("AC") to direct current ("DC") adapter to power a portable computer is known. It is also known to use the adapter to power the computer and simultaneously charge the battery for the portable computer. However, known adapters and charging systems are very limited in the number and type of batteries they can recharge. Although many different types of batteries can be used with any given computer; a separate battery charger is needed for each of these different types, as the charger is preset to charge at a specific rate and for a specific amount of time. Known chargers are also passive devices which cannot vary the charging current or time in response to the battery's actual condition.

Known attempts to integrate the mechanisms of an AC adapter and a battery charger have resulted in units that are somewhat awkward to use. Typically, the battery charger is a separate unit from the AC adapter. This increases the number of devices that a user must own and manipulate and prevents the battery charger from being used conveniently with the adapter.

Given the limitations of known AC adapters and battery chargers, a single AC adapter/battery charger that could recharge several different types of battery packs and that could actively monitor the charging status of the battery pack and modify the charging process to accommodate individual variations in the battery pack would be very desirable. If these qualities could be realized in a compact and physically well-designed package, the device would be even more desirable.

SUMMARY OF THE INVENTION

A first preferred embodiment of the present invention comprises a power supply unit for a portable computer system, the power supply unit further comprised of an AC adapter unit and a battery charging unit. The adapter unit converts 120/220 V AC power into DC power and supplies that power to the computer system it is coupled to and/or to the battery charger. When used, the battery charger unit couples to the AC adapter unit and provides charging current to one of the up to two battery packs the charger can hold. The charger unit is capable of detecting the type of battery pack inserted into it, recalling from memory the appropriate charging protocol for that battery and then monitoring the on-going charging process.

Additional aspects of the present invention will be discussed with reference to the figures listed and described below:

BRIEF DESCRIPTION OF THE FIGURES

FIG. 1 is a side perspective of a first embodiment of the present invention;

FIG. 2 is a top perspective of the embodiment shown in FIG. 1;

FIG. 3 is a side perspective of the AC adapter of the present invention;

FIG. 4 is a top perspective of the AC adapter shown in FIG. 2;

FIGS. 5a and 5b are, respectively, detailed drawings showing the "duck head" socket adapter of the present invention and how the "duck head" attaches to the AC adapter;

FIG. 6 is a top perspective of the battery charger of the present invention;

FIG. 7 is a side perspective of the battery charger shown in FIG. 6;

FIGS. 8a through 8d are schematic drawings of the present invention; and

FIGS. 9a and 9b are flow charts showing the operation of the first embodiment of the present invention.

DETAILED DESCRIPTION OF THE PREFERRED EMBODIMENT

Figure 8B:
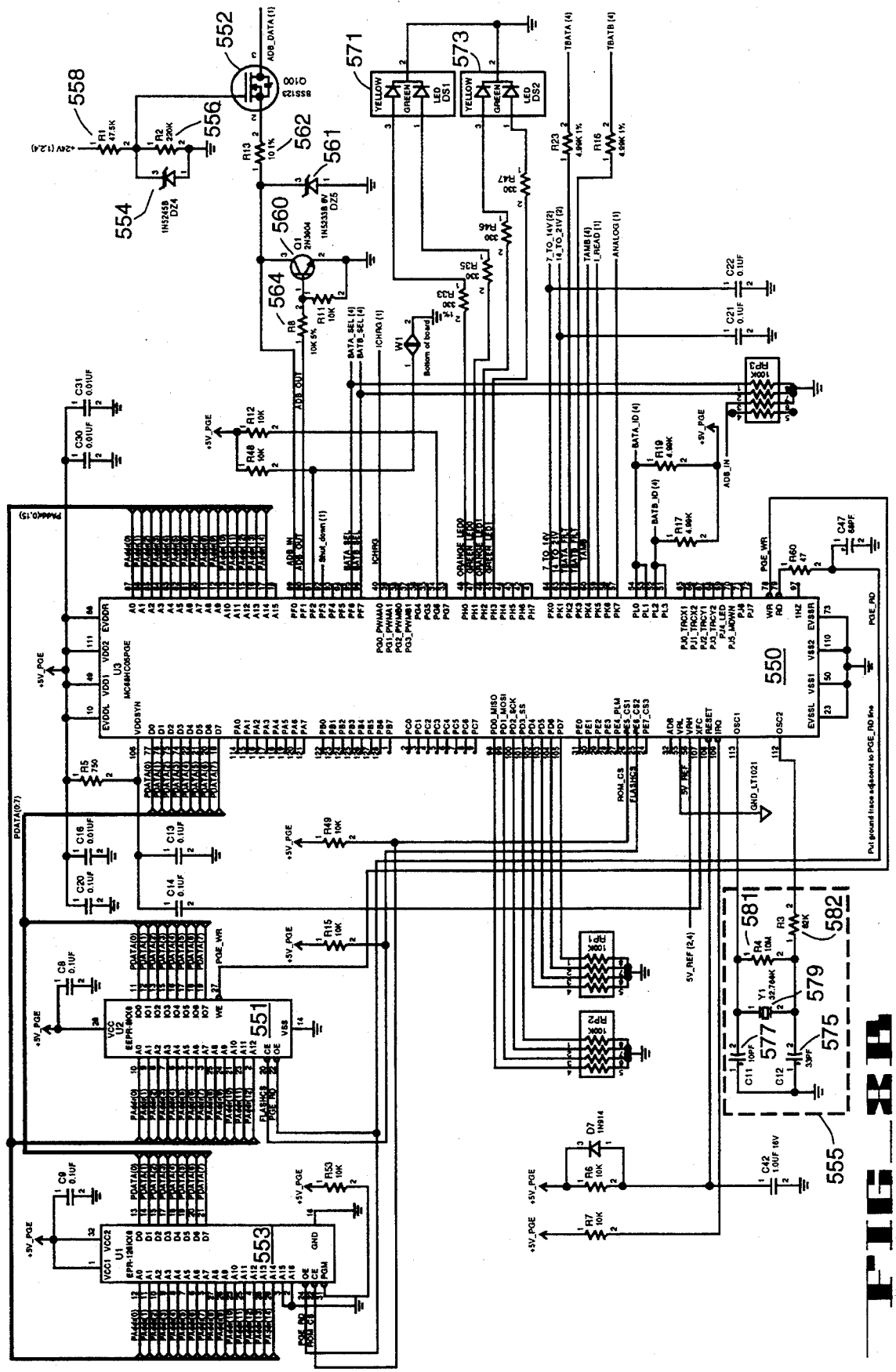

In its first preferred embodiment, the present invention can be described as being comprised of two components, AC adapter 100 and battery charger 200, which are shown coupled together in FIG. 1. In operation, AC adapter 100 can be used alone to power a computer. Battery charger 200 is not capable of independent operation in this embodiment. It should be noted that for purposes of this disclosure, the present invention will be described as operating in conjunction with a portable personal computer having a central processing unit ("CPU"). The specific type of computer is irrelevant, as the present invention can be easily modified to function correctly with any one of several types of CPUs.

Battery charger 200 can be unlocked from AC adapter 100 by depressing button 230 which then releases a latching mechanism. Battery charger 200 can, in this first embodiment, accept and charge up to two different battery packs at a given time. These packs would be inserted into sockets 210 and 220 and receive charging current and transmit sensor information through connectors 211 and 221 (FIG. 2) in slots 210 and 220, respectively. AC adapter 100 supplies DC power to the portable computer through power cord 110. Slots 120 and 122 (FIG. 3) in AC adapter 100 receive hooks 242 and 244 (FIGS. 6 and 7) from battery charger 200 when the two components are locked together. Depressing button 230 on battery charger 200 depresses hooks 242 and 244, allowing the charger and adapter to be joined together, with the hooks inserting into the slots. Releasing button 230 allows the hooks to deflect upwards, which engages them with the upper edge of the slots, thus locking the two components together. Plug 246 (FIG. 7) extends into socket 130 (FIG. 3) and allows DC power to flow from adapter 100 to charger 200 and for computer data to flow from and to charger 200 through adapter 100.

AC adapter 100 is also provided with an integral power cord management feature. Arms 112 and 114 (FIG. 2) each pivot outward from adapter 100. Each arm, when pivoted outwards, forms an "L" shape. Together, they provide two uprights to wrap DC power output line 110 around. The bottom portions of the "L" prevent line 116 from slipping over the arms and unraveling. DC power line 110 has a clip 111 on socket 113 that allows it to be clipped to line 110. When line 110 is coupled to a computer, arms 112 and 114 retract into AC adapter 100. This arrangement allows for very neat cable stowage during periods of non-use, but, when adapter 100 is used, the arms can be retracted out of the way to eliminate any possible interference. The arms are shown in their extended position in FIGS. 1,2, and 3. FIG. 4 shows adapter 100 with one arm extended and the other retracted.

AC adapter 100 can be coupled to an AC power source in one of two ways. The first is through a conventional AC electrical extension cord connector (not shown). The second is through AC power plug 140, which is shown in FIG. 5a. In profile view AC power plug 140 resembles a "duck head". As shown in FIG. 5b, when "duck head" AC power plug connector 140 is used to couple AC adapter 100 to a wall socket, slots 120 and 122 abut the wall, preventing charger 200 from being coupled to adapter 100. If charger 200 could be coupled to AC adapter 100 when the adapter was using the "duck head", AC power plug connector 140 placing two battery packs into the charger would result in a very unstable system. Recharging battery packs in such a configuration would not be reliable. Plug 110 can also be readily adapted for use with different types of sockets, such as those used in Europe. As AC adapter 100 can use either 220 V or 110 V AC power, this feature makes international use of the present invention easy and economical.

As stated, AC adapter 100 and battery charger 200 are coupled together by a self-centering spring-loaded latch mechanism, which is illustrated in FIGS. 3 and 7. Depressing button 230 on battery charger 200 depresses hooks 244 and 242, which can then be inserted into slots 120 and 122 in AC adapter 100. Releasing button 230 allows hooks 242 and 244 to spring upwards and latch, coupling the two units together securely. Electrical plug 246 inserts into socket 130, allowing DC current to flow into battery charger 200 and allowing information regarding the battery packs inserted into the charger to flow to and from the computer to which the present invention is coupled.

FIGS. 8a through 8d are schematic drawings of the components of battery charger 200. For purposes of this application, AC converter 100 is merely an electronic "black box", permitting the transmissions of data between the computer and the battery charger and acting as a universal transformer, converting voltages from 110 to 240 V AC to 24 V DC. That voltage is delivered to battery charger 200 with power levels of up to a continuous 25 watts, with 30 watts being available for up to two minutes.

The portion of battery charger 200 illustrated in FIG. 8a couples the charger to the battery packs which will be charged and also generates an ambient temperature signal. Transistors 501 and 503 are turned on and off by a battery select signal generated by microcontroller 550 (FIG. 8b). In this embodiment of the present invention, a maximum of two battery packs can be placed in the charger. Only one of the battery packs will be charged at any given moment. Transistor 501 allows battery pack A (not shown) to be charged when battery pack A is placed in battery charger 200. Alternatively, transistor 503 allows battery pack B to be charged when battery pack B is placed in battery charger 200. Connectors 513 and 515 couple charger 200 to battery pack A or B, respectively. Given the connections between connectors 513 and 515, diodes 505 and 507 are needed to prevent a charged, unselected battery pack from charging a discharged, selected battery pack. Thermistor 509 is used to generate a voltage signal whose magnitude depends upon the ambient temperature. Each battery pack has a similar thermistor/resistor circuit within it to generate a variable voltage signal which indicates the temperature of the battery pack being charged. By knowing both the ambient temperature and the internal temperature of the battery pack being charged, the charger can detect defective battery packs and optimize the charging of battery packs.

FIG. 8b shows microcontroller 550 and its supporting circuitry. Microcontroller 550 is, in this embodiment, a highly customized version of the Motorola MC68HC05 microcontroller with at least one internal analog/digital ("A/D") converter. Those aspects of the microcontroller which differ from those of the unaltered Motorola device will be discussed in detail herein. Programmable read only memory ("PROM") 553 stores the operating instructions for battery charger 200. Electrically erasable programmable read only memory ("EEPROM") 551 stores the various charger profiles for the different types of battery packs that the present invention can recharge. If a particular charging profile is not already in EEPROM 551 when a new battery pack is inserted into the charger, microcontroller 550 can communicate with the computer to which it is coupled and download a charging profile stored in the computer into EEPROM 551. This is accomplished over an appropriate communication system, for example the Apple Desktop Bus ("ADB") communications bus and protocol found in Apple Macintosh ® computers manufactured by Apple Computer, Inc., Cupertino, Calif. Macintosh ® is a registered trademark of Apple Computer, Inc.

To prevent the possibility of the computer attempting to communicate with battery charger 200 when battery charger 200 is disconnected from its 24 V power supply, transistor 552 is coupled to the 24 V voltage source through resistors 556 and 558, as well as diode 554. Should power be interrupted, transistor 552 is immediately turned off, shutting off communication on the ADB line. Diode 561 and resistor 562 provide electrostatic shock protection on the ADB line. Transistor 560, along with bias resistors 564 and 563 amplify outgoing data transmissions.

Light Emitting Diodes ("LED"s) 571 and 573 indicate the Charging status of battery packs A and B, respectively, under the control of microcontroller 550. For each battery pack; if the orange LED is lit, that battery pack is being charged. if the green LED is lit, the battery pack is fully charged. If the orange LEDs are both flashing simultaneously, it indicates that the stored charging program in EEPROM 551 is defective and that new software should be loaded. Clock circuit 555 provides a clock signal to microcontroller 550 in a known fashion, with inputs OSC1 and OSC2 each receiving the same clock signal, except that the received signals are 180° out of phase. Clock circuit 555 is comprised of capacitors 575 and 577, resistors 581 and 582, and crystal 579. The resistors and capacitors are used to tune the crystal's rate of oscillation. Microcontroller 550 has an internal phase locked loop ("PLL") that allows it to generate a higher internal clock frequency using the clock signal from clock circuit 555. In this embodiment, microcontroller 550 runs at 4.2 MHz.

Figure 8C:
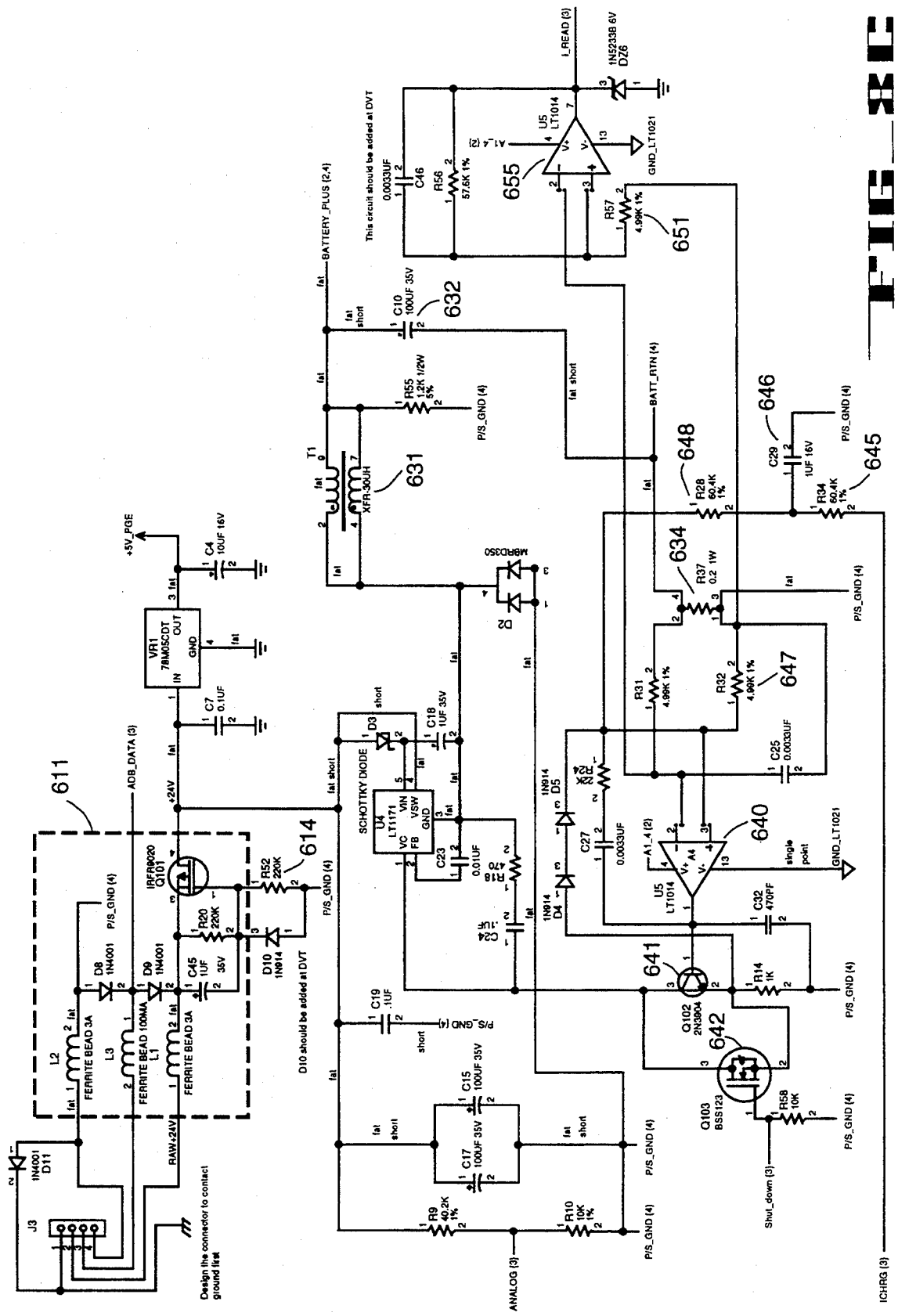
Figure 30:
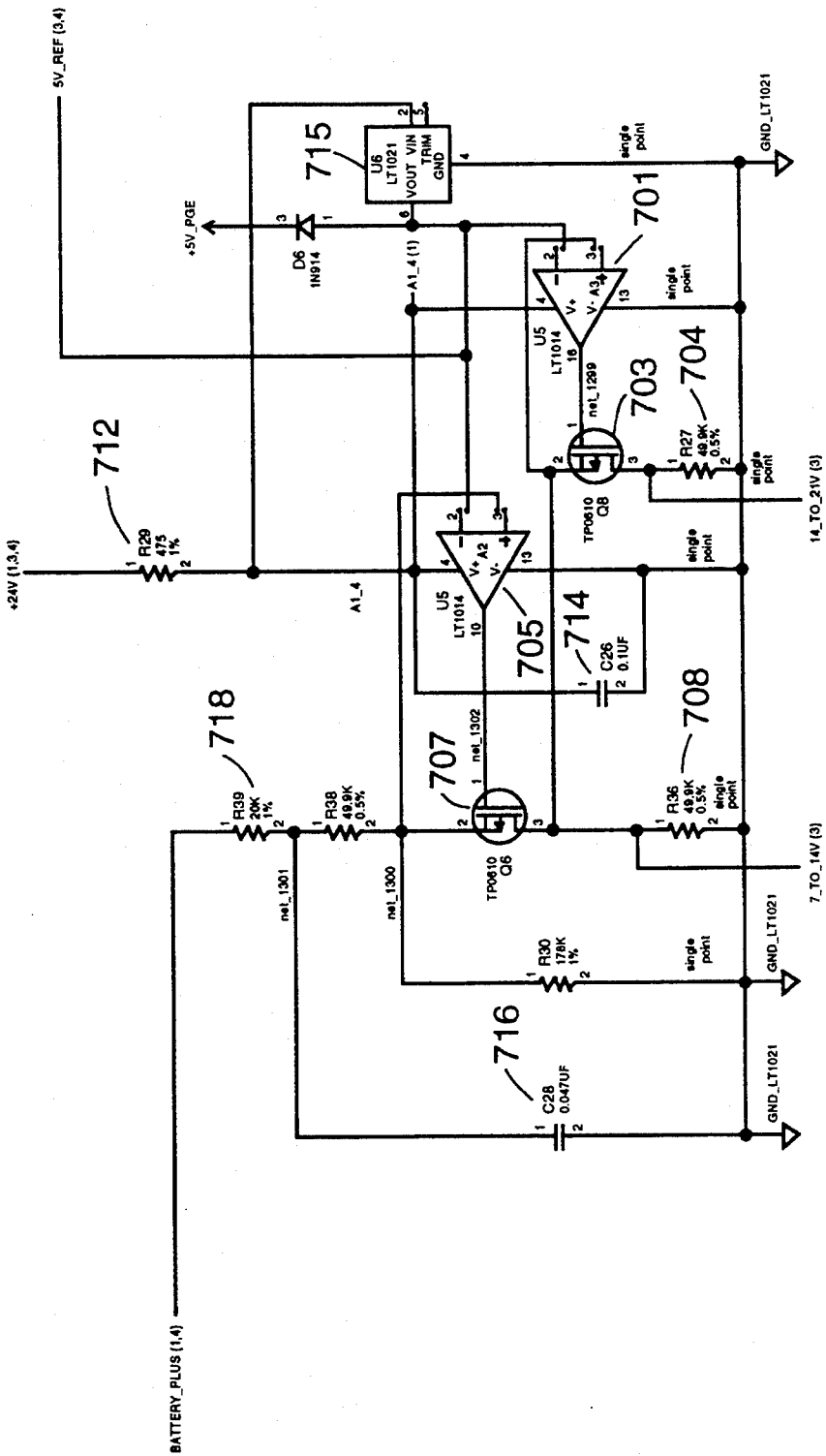

FIG. 8c is a schematic of the circuitry that provides charging current to the battery packs. Connector 601 connects to AC converter 100 and is designed so that a ground connection is made before the 24 V DC output of AC converter 100 is supplied to the charger's circuitry. In the case where battery charger 200 is coupled to the AC adapter when the AC adapter is already on and supplying power to the computer, inrush control circuit 610 filters the incoming DC voltage and also slows the application of the input to the charger's circuitry. Initially transistor 611 is off. As voltage is applied, resistors 613 and 614 and capacitor 612, which together create an RC time constant circuit, allow the voltage on the gate of transistor 611 to turn on gradually. This circuit prevents arcing when battery charger 200 is coupled to an already operating AC converter 100 and the pitting on connector 601 that would occur as a result thereof.

The incoming 24 V DC voltage is applied to precision voltage regulator 620 which is a known linear regulator which is used herein to supply a +5 V voltage to microcontroller 550.

The incoming 24 V DC voltage is also applied to pulse width modulation (PWM") switcher 630. PWM switcher 630 generates a square wave with a variable duty cycle by coupling node B to ground or the incoming +24 V DC voltage. The rate at which PWM switcher 630 alternates between these two voltage levels is varied to maintain a predetermined charging current on the battery pack. The circuit which regulates PWM switcher 630 is described below. The square wave output of PWM switcher 630 is integrated and filtered by inductor 631 and capacitor 632. As the output current of an inductor cannot change instantaneously, once capacitor 632 is fully charged, the square wave input to inductor 631 is converted into a relatively constant DC output voltage. The output voltage (node D) applied to the battery pack being charged is a function of the duty cycle of PWM switcher 630. Current flows to the battery pack once the voltage on node D exceeds the battery pack's terminal voltage.

After current output from transformer 631 and capacitor 632 flows through the particular battery pack being charged, it flows back to the circuit illustrated in FIG. 8c at node A, from where it is applied to current sensing resistor 634. The voltage difference across resistor 634, which is proportional to the level of current leaving the battery pack, is applied to the positive input of amplifier 640, which is used here as a differential voltage amplifier. The negative input of amplifier 640 is coupled through resistor 645 and capacitor 646 to a PWM signal from microcontroller 550. Capacitor 646 and resistor 645 act as a voltage integrator, generating a DC voltage signal from the PWM signal from the microcontroller. In the present invention, the wider the pulse from the microcontroller, the higher the DC voltage level. A feedback loop from the output of amplifier 640 through resistors 647 and 648 scales the DC voltage to the proper millivolt level.

Based on the difference between the two voltage input signals to amplifier 640, the output of amplifier 640 varies the amount of current flowing through transistor 641. When the sensed voltage is greater than the reference voltage, the bias current of transistor 641 is increased. This in turn sinks more current from PWM switcher 630. The more current that is sunk from switcher 630, the shorter its duty cycle, which in turn lowers the voltage on node C. When the sensed voltage is less than the reference voltage, the operation of this circuit is the inverse of what has just been described. In the case where microcontroller 550 commands the battery charger to shut down, transistor 642 is turned on, which then sinks all of switcher 630's current, turning it off.

Resistors 651 and 652 in combination with operational amplifier 655 form a DC voltage amplifier that amplifies the voltage across current sensing resistor 634 by a factor of 12.5. The output of amplifier 655 is transmitted to microcontroller 550. After this output is converted to a digital signal by microcontroller 550's internal A/D converter, the microcontroller can determine if the magnitude of the current through resistor 634 indicates that the proper charging level is being maintained. A scale of from 0 to 5 VDC represents a current range of from 0 to 1 A.

The remainder of battery charger 200's circuitry is shown in FIG. 8d. The incoming 24 V DC, taken from node C in FIG. 8c, is filtered by resistor 712 and capacitor 714 and supplied to the input of power supply 715, which generates a precision +5 V DC signal. The filtered DC voltage from resistor 712 and capacitor 714 is also used to provide power to amplifiers 701 and 705. The precise +5 V DC output of power supply 715 is used as a +5 V DC reference for amplifiers 701 and 705. Amplifiers 701 and 705, in combination with transistors 703 and 707 and resistors 704 and 708, respectively, act as voltmeters producing a signal which at the output of resistor 708 provides a voltage between 0 and 5 V which is scaled to represent a voltage between 7 and 14 V, and which at the output of resistor 704 generates a voltage between 0 and 5 V which is scaled to represent a voltage between 14 and 21 V. This voltage information, in combination with time signals generated by microcontroller 550 and temperature signals derived from both the ambient temperature sensor and the battery pack temperature sensors, allows various types of battery charging regimes to be implemented, including change-in-temperature charging ("A T") and change-in-voltage charging("A V"). A T charging is based upon the fact that as a battery pack approaches full charge, more and more of the power supplied to it for charging is unusable and becomes waste heat. The rate at which current is converted to heat increases dramatically as the battery pack nears full charge. By tracking the increase in temperature of the battery pack as a function of time, this sudden increase that occurs when the pack is nearly fully charged can be detected and charging operations halted. AV charging is based upon the fact that the time rate of change of the battery pack's voltage becomes zero and then negative as its maximum voltage level is reached. Charging should therefore be stopped as soon as the rate of change of the voltage becomes zero.

FIGS. 9a and 9b are flow charts detailing the operation of the system whose circuitry was shown in FIGS. 8a through 8d. When battery charger 200 is not coupled to AC converter 100, converter 100 simply supplies power to the computer it is coupled to. This process is not illustrated in the flow charts. FIG. 9a illustrates the operation of the first embodiment of the present invention in very broad terms. At step 910, when battery charger 200 is coupled to converter 100, it first attempts to establish communication with the computer the AC adapter may be connected to over the ADB line. This is done by testing the ADB line to see if it is active. If the line is active, the system goes through an ADB command process at step 920. This process requires the computer which is coupled to the present invention to determine if charger 200 is "located" at a predetermined unique address in the computer's memory. If it is not, the address of the charger is changed in the computer to reflect the charger's actual address. After communication with the computer is established, charger 200 can send the identification number, the temperature and the voltage of the battery pack being charged to the computer. After this information is sent to the computer, charging of the battery pack begins at step 930, after which the system loops and returns to step 910. If the ADB line is not active, the system checks a 50 millisecond ("ms") timer at step 915. If the 50 ms timer has not expired, the ADB line is tested again at step 910. If the timer indicates that 50 ms has elapsed, then the system proceeds to battery charging at step 930. The process illustrated in FIG. 9a is repeated every 11 ms.

FIG. 9b details the process of actually charging the battery packs. Charger 200 has two charging rates, a first, full power charging rate of 1 A and a second charging rate of 500 mA. If charger 200 cannot establish communication with the computer, the first full power charging rate is used. If communication is established, the first rate may still be used if the computer so indicates. Otherwise, the second 500 mA charging rate is utilized. Additionally, if the computer to which charger 200 is coupled is in a run mode and the computer's internal battery pack is being charged, then charger 200 does not attempt to charge battery packs placed in its charging slots. These actions are dictated by the limited amount of power provided by AC adapter 100.

If charger 200 cannot establish communication within a defined amount of time (step 915, FIG. 9a), it simply moves on to its next task, charging the battery (step 930, FIG. 9a). The system attempts to establish communication every 11 ms. Next, a one second timer is sampled at step 930.1. If one second has not elapsed, the system returns to step 910. If one second has elapsed, charger 200 next checks to see if there is a battery in slot A (step 931, FIG. 9b). As part of this step, microcontroller 250 tries to read the identification number of the battery pack, which is stored in a very small ROM chip in each battery pack. The chip stores a single 64-bit word which contains information indicating the type of battery, such as nickel-cadmium ("NiCad"), nickelhydride("NiH"), lead based, or lithium and the battery pack's serial number. Alkaline battery packs, as they cannot be recharged, are not provided with a ROM chip. Instead, the output leads in such a battery pack are shorted together, which results in microcontroller 250 detecting a serial number of 0 when it attempts to read the ROM chip in an alkaline pack. Detection of a 0 indicates to charger 200 that it should not recharge that battery pack.

If a number can be read, it indicates to microcontroller 250 what kind of battery is being charged and allows microcontroller 250 to access EEPROM 551 (FIG. 8b) and retrieve the proper charging profile. If the proper charging profile is not stored in the EEPROM, charger 200 will attempt to read it from the computer's main memory over the ADB line for storage in the EEPROM. This ability to communicate with a computer also allows the charging profiles used by the present invention, as well as the software that directs the present invention, to be debugged from that computer, expediting the development of new charging programming.

If there is a battery in slot A and no battery in slot B, as determined at step 933, then microcontroller 250 begins to charge battery pack A at the rate indicated by the routine stored in EEPROM (step 935).

If no battery pack is found in slot A and, at step 937, no battery is found in slot B, then the present invention returns to step 910 in FIG. 9a, to check if the ADB line is active. If no battery packs are present, then the system acts exactly the same as if the charger was not coupled to the converter and the converter merely supplies DC power to the computer, with the charger communicating or attempting to communicate with the computer every eleven ms.

if battery packs are found in both slots A and B, then, at step 939, the charger checks to see if battery pack A is new (uncharged). If it is new, then the system checks to see if battery pack B is new at step 941. If battery pack B is also new, then the system returns to step 935 and charges battery pack A.

If battery pack B was not new, however, the system checks at step 943 to determine is battery pack B is fully charged. If it is, battery pack A is charged at step 935. If it is not fully charged, the system then charges battery pack B at step 945. Battery pack B is also charged if the result of step 937 indicated that there was no battery pack A and there was a battery pack B.

If, at step 939, it was found that battery pack A was not new, the system next tests to see if battery pack A is fully charged at step 947. If it is not fully charged, the system returns to step 935 and charges battery pack A. If battery pack A is fully charged, the system tests battery pack B at step 949 to see if it is fully charged. If it is determined that both battery packs are fully charged, then, at step 951 battery pack A is trickle charged, at step 953 a time offset is incorporated, and, at step 955, battery pack B is trickle charged. Trickle charging involves supplying one second of charging current to each battery pack once each minute. As charger 200 cannot simultaneously provide two such pulses to the two battery packs it may have installed in its charging slots, the timing offset which staggers the two pulses, indicated by step 953, insures that both packs will not be pulsed simultaneously.

As noted previously, the circuitry of the present invention is capable of keeping track of the change in temperature of a battery pack over time ($\Delta T$), as well the battery pack's change in voltage over time $\Delta V$). With some types of battery packs, a full charge can be detected by watching for a negative $\Delta V$ occurring simultaneously with a large positive $\Delta T$. Large positive $\Delta T$ without any corresponding increase in the battery pack's voltage indicate a defective battery pack. Microcontroller 550 would in that case halt the charging of the battery pack.

The serial number of the battery pack can also be used to access other stored information regarding the previous charging history of the battery pack. Some types of battery packs, such as nicads, can, if not fully discharged during use, develop a "memory" which prevents them from being fully discharged at any time, thereby limiting the usefulness of the battery pack. By tracking the battery's previous charging history, the present invention can alter the charging profile to minimize the effects of this problem.

As the amount of power that AC converter 100 can supply is limited, microcontroller 550 communicates with the computer on a constant basis. Inside the computer there is a microcontroller similar to microcontroller 550, which monitors power usage and needs internal to the computer. If the power needs of the computer increase suddenly, as, for example, when the hard disk or other components are turned on, the computer will communicate over the ADB line to microcontroller 550, which will then cease charging the battery pack. When the power requirements of the computer again diminish, charging operations resume at the point where they were halted. If a battery pack is removed from the charger during recharging, the charger detects its loss when it tries to sample the battery pack to determine its state of charge. This status check occurs once every 11 milliseconds. If the same battery pack is subsequently reinserted into the charger, operations commence at the original starting point, where the charger reads the battery pack's type and serial number.

Although the invention has been explained with reference to the foregoing embodiments, it should be apparent to one skilled in the art that numerous changes and modifications may be made thereto without departing from the scope or spirit of the invention. For example, charging profiles for new types of battery packs could be installed, the power output of the AC adapter could be increased, allowing more battery packs to be charged simultaneously, and the size of the memories could be increased to allow storage of additional charging profiles. Other changes, modifications and applications of the invention will become apparent to one skilled in the art in view therefore of this disclosure. Thus, the invention should be limited only in accordance with the appended claims.

What is claimed is:

1. A method for charging a battery pack having a first memory for indicating a multiplicity of battery identification data comprising at least a serial number identifying the battery pack, the method comprising the steps of:
    inserting the battery pack into a battery charger further coupled to a computer, said battery charger comprising at least a controller, a second memory for storing battery identification data corresponding to a multiplicity of known battery packs, and a charging current generator;
    reading the battery identification data of said battery pack from said first memory with the controller;
    determining whether the battery pack inserted in said battery charger is one of said known battery packs by comparing said battery identification data read from the battery pack against said battery identification data stored in said battery charger;
    reading via said controller from the second memory at least one charging profile corresponding to the battery identification data read from said first memory,
and
    charging the battery pack with an electrical current according to the charging profile by varying the electrical current produced by the charging current generator.

2. The method of claim 1 further comprising the steps of:
    coupling the battery charger to a computer by a DC power cord, and
    transmitting via the DC power cord new charging profiles from the computer to the second memory if the first memory does not contain a charging profile corresponding to the battery pack whose serial number was read.

3. A power supply and battery charger arrangement for a computer comprising:
    alternating current (AC) adapter for converting AC power to direct current (DC) power, the AC adapter communicatively coupled to the computer and supplying the computer with the DC power to operate and charge an internal battery;
    the battery charger detachably coupled to the AC adapter for charging at least one battery pack placed in the battery charger, said battery charger comprising:
        a feedback-controlled charging current generator for producing a charging current which can be varied according to a feedback control signal;
        a controller coupled to the feedback-controlled charging current generator for generating the feedback control signal according to at least one charging profile, and
        a first memory coupled to the controller for storing said charging profile;
    said battery charger, when said charging profile stored in said first memory does not correspond to said battery pack placed in the battery charger, signaling said computer to transmit new charging information corresponding to said battery pack.

4. The power supply and battery charger arrangement of claim 3 wherein the AC adapter is coupled to the computer by a DC power cord having a power socket, the AC adapter being further provided with a DC power cord retention portion extending from the AC adapter when in use to retain the DC power cord and withdrawing into the AC adapter when the DC power cord is coupled to the computer.

5. The power supply and battery charger arrangement of claim 3 wherein the controller communicates with the computer through the DC power cord of said AC adapter to transmit at least one new charging profile from the computer to the first memory.

6. The power supply and battery charger arrangement of claim 3 wherein the AC adapter may be detachably coupled to an AC power source by first and second AC power connectors, the first AC power connector enabling the battery charger to be coupled to the AC adapter, the second AC power connector preventing the battery charger from being coupled to the AC adapter.

7. The power supply and battery charger arrangement as set forth in claim 3, wherein:
    the battery pack comprises a second memory for indicating a multiplicity of battery identification data including at least a serial number identifying the battery pack,
    said controller the battery identification data including reading at least the serial number of said battery pack from said second memory and determining whether the battery pack inserted in said battery charger is one of said known battery packs by comparing said battery identification data read from the battery pack against the battery identification data stored in said battery charger;
    if said battery identification data read from said battery pack placed in said battery charger does not correspond to any of said battery identification data stored in said battery charger, said controller then communicates with said computer via said AC adapter to request that said computer transmit at least one new charging profile corresponding to the battery identification data read from said second memory;
    said charging current generator thereafter charging the battery pack with an electrical current according to the new charging profile transmitted by the computer to the battery charger.

8. The power supply and battery charger arrangement as set forth in claim 7, wherein the new charging profile is stored in said first memory after the new charging profile is transmitted by the computer to the battery charger, such that if the battery pack causing the communication with the computer were again placed in the battery charger, the controller would retrieve the charging profile corresponding to said battery pack directly from said first memory.

9. The power supply and battery charger arrangement of claim 7 wherein the AC adapter is coupled to the computer by a DC power cord having a power socket, the AC adapter further comprising a power cord stowage portion extending from the AC adapter to retain the DC power cord when the DC power cord is not in use, said power cord stowage portion retracting into the AC adapter when the DC power cord is coupled to the computer.

10. A method for charging a battery pack having a first memory for indicating a multiplicity of battery identification data comprising at least a serial number identifying the battery pack, the method comprising the steps of:

inserting the battery pack into a battery charger further communicatively coupled to a computer, said battery charger comprising at least a controller, a second memory for storing battery identification data corresponding to a multiplicity of known battery packs, and a charging current generator;

reading the battery identification data of said battery pack from said first memory with the controller;

determining whether the battery pack inserted in said battery charger is one of said known battery packs by comparing said battery identification data read from the battery pack against said battery identification data stored in said second memory of said battery charger;

if said battery pack inserted in said battery charger is not one of said known battery packs, then said controller communicating a request that the computer transmit at least one new charging profile corresponding to the battery identification data read from said first memory of the battery pack placed in the battery charger; and charging the battery pack with an electrical current according to the new charging profile by varying the electrical current produced by the charging current generator.

11. The method for charging a battery pack according to claim 10, wherein the step of communicating said request to the computer comprises the step of coupling an alternating current (AC) adapter between the computer and said controller, said AC adapter further converting AC power to direct current (DC) power to supply the computer with the DC power to operate and charge an internal battery.

* * * * *